US011995139B2

(12) United States Patent
Prasad et al.

(10) Patent No.: US 11,995,139 B2
(45) Date of Patent: May 28, 2024

(54) KNOWLEDGE ATTRIBUTES AND PASSAGE INFORMATION BASED INTERACTIVE NEXT QUERY RECOMMENDATION

(71) Applicant: Microsoft Technology Licensing, LLC, Redmond, WA (US)

(72) Inventors: Gautam Prasad, Hyderabad (IN); Mohamed Salman Ismail Gadit, San Jose, CA (US); Rajendra Bhimsen Shinde, Hyderabad (IN); Dominika Urbanska, Bellevue, WA (US); Alexander Chamberlain, Fremont, CA (US); Mohak Sharma, Hyderabad (IN); Katherine Marie Sather, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 57 days.

(21) Appl. No.: 17/555,308

(22) Filed: Dec. 17, 2021

(65) Prior Publication Data
US 2023/0117568 A1 Apr. 20, 2023

(30) Foreign Application Priority Data
Oct. 18, 2021 (IN) .............................. 202141047029

(51) Int. Cl.
*G06F 16/00* (2019.01)
*G06F 16/9532* (2019.01)
*G06F 16/9538* (2019.01)
(52) U.S. Cl.
CPC ...... *G06F 16/9538* (2019.01); *G06F 16/9532* (2019.01)

(58) Field of Classification Search
CPC ..................... G06F 16/9538; G06F 16/9532
See application file for complete search history.

(56) References Cited

U.S. PATENT DOCUMENTS 8,275,759 B2 * 9/2012 Imig ................... G06F 16/9535
707/706
2010/0070484 A1 * 3/2010 Kraft .................... G06F 16/951
707/723

(Continued)

OTHER PUBLICATIONS

Lei Liu et al., "LearningAssistant: A Novel Learning Resource Recommendation System", IEEE, pp. 1-4 (Year: 2015).*

(Continued)

*Primary Examiner* — Jared M Bibbee
(74) *Attorney, Agent, or Firm* — Calfee, Halter & Griswold LLP

(57) ABSTRACT

A computing system receives an indication that a user has selected a passage shown on a search engine results page (SERP) presented on a display. Upon receiving the indication, the computing system identifies a plurality of suggested queries related to the passage, where the plurality of suggested queries are generated based upon the passage and an entry for an entity in a knowledge graph. Upon identifying the plurality of suggested queries, the computing system presents the plurality of suggested queries in a pop-up graphical element that overlays a portion of the SERP, where the pop-up graphical element is located proximate to the passage shown on the SERP. When a query in the plurality of suggested queries is selected, a second SERP is presented on the display, where the second SERP is based upon the query.

20 Claims, 13 Drawing Sheets

(56) References Cited

U.S. PATENT DOCUMENTS

| | | | | |
|---|---|---|---|---|
| 2010/0228710 | A1* | 9/2010 | Imig | G06F 16/9535 |
| | | | | 707/706 |
| 2011/0072033 | A1* | 3/2011 | White | G06F 16/3322 |
| | | | | 715/846 |
| 2014/0282136 | A1* | 9/2014 | Marantz | G06F 16/1767 |
| | | | | 715/764 |
| 2015/0006505 | A1* | 1/2015 | Plakhov | G06F 16/3328 |
| | | | | 707/710 |
| 2016/0004706 | A1* | 1/2016 | Faghihi Rezaei | G06F 16/3322 |
| | | | | 707/706 |
| 2016/0267200 | A1* | 9/2016 | Guo | G06F 3/0488 |
| 2020/0320147 | A1* | 10/2020 | Bacha | G06F 16/953 |
| 2023/0031412 | A1* | 2/2023 | Singhal | G06F 16/9566 |

OTHER PUBLICATIONS

Cho, et al., "Learning Phrase Representations using RNN Encoder-Decoder for Statistical Machine Translation", In Proceedings of the Conference on Empirical Methods in Natural Language Processing, Oct. 25, 2014, pp. 1724-1734.

Dirkson, et al., "Breaking BERT: Understanding its Vulnerabilities for Biomedical Named Entity Recognition through Adversarial Attack", In Repository of arXiv:2109.11308v2, Oct. 14, 2021, 10 Pages.

Dong, et al., "Distilling Structured Knowledge for Text-Based Relational Reasoning", In Proceedings of the 2020 Conference on Empirical Methods in Natural Language Processing, Nov. 2020, pp. 6782-6791.

Graves, et al., "Speech Recognition with Deep Recurrent Neural Networks", In Proceedings of IEEE International Conference on Acoustics, Speech and Signal Processing, May 26, 2013, pp. 6645-6649.

Hamilton, et al., "Inductive Representation Learning on Large Graphs", In Proceeding of the 31st Conference on Neural Information Processing Systems, Dec. 2017, 19 Pages.

Hochreiter, et al., "Long Short-Term Memory", In Journal of Neural Computation, vol. 9, Issue 8, Nov. 15, 1997, 32 Pages.

Radford, et al., "Improving Language Understanding with Unsupervised Learning", In Technical Report, OpenAI, Jun. 11, 2018, 8 Pages.

Radford, et al., "Language Models are Unsupervised Multitask Learners", In Journal of OpenAI blog, vol. 1, Issue 8, Feb. 24, 2019, 24 Pages.

Rumelhart, et al., "Learning Representations by Back-Propagating Errors", In Journal of Nature, vol. 323, Issue 6088, Oct. 9, 1986, pp. 533-536.

Vaswani, et al., "Attention Is All You Need", In Journal of Computing Research Repository, Jun. 12, 2017, 15 Pages.

You, et al., "GraphRNN: A Deep Generative Model for Graphs", In Repository of arXiv:1802.08773v1, Feb. 24, 2018, 12 Pages.

"International Search Report and Written Opinion Issued in PCT Application No. PCT/US22/040017", dated Oct. 28, 2022, 11 Pages.

* cited by examiner

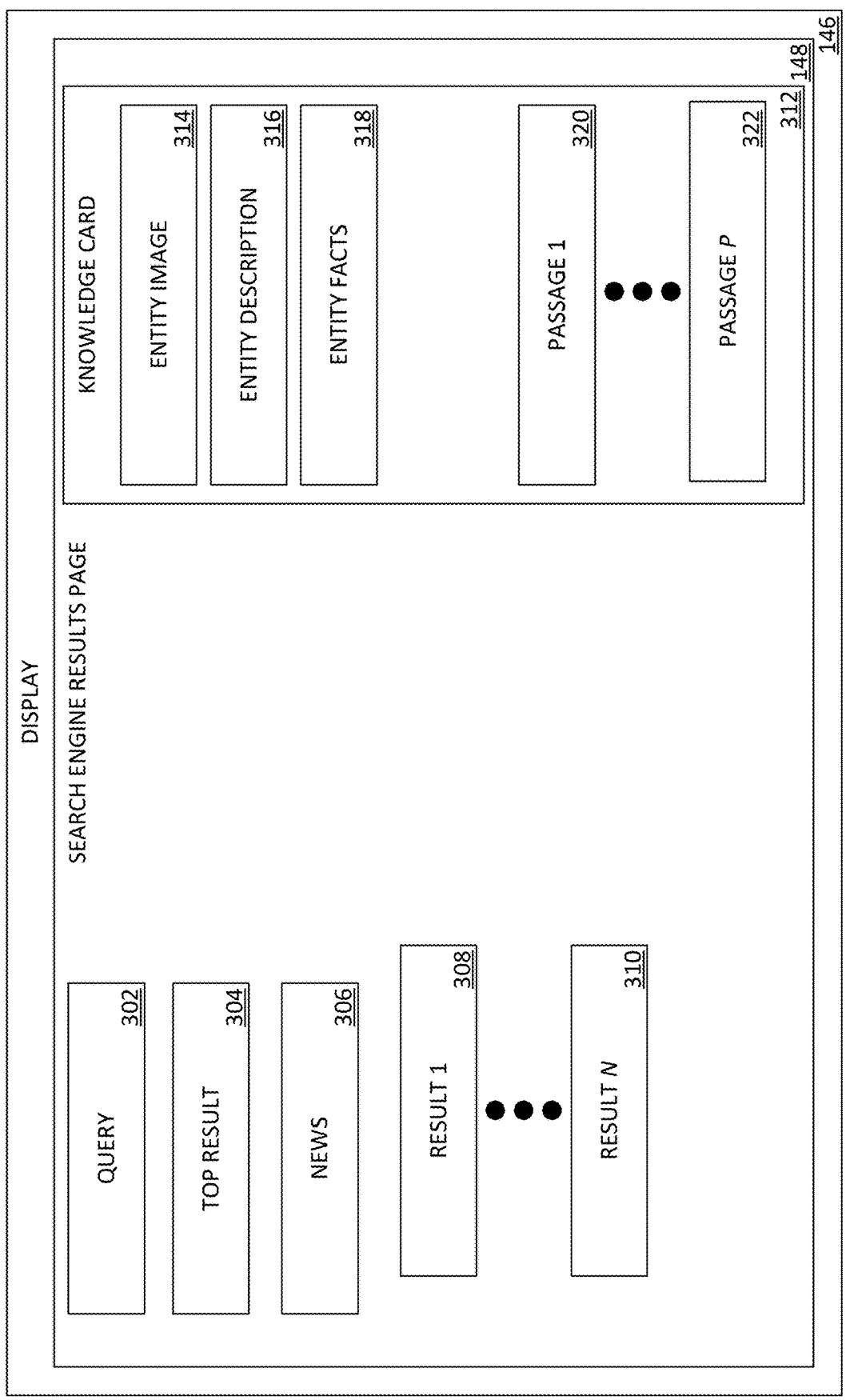

Also try
- stephen hawking book summary
- stephen hawking books list
- stephen hawking theory Stephen Hawking worked on the physics of black holes. He also wrote best-selling books, the most famous of which was A Brief History of Time: From the Big Bang to Black Holes(1988)

Also try
- bernie sanders biography
- bernie sanders political affiliation
- bernie sanders political views Sanders began his electoral political career in 1971 as a member of the Liberty Union Party which originated in the anti-war movement and the People's party.

Also try
- bernie sanders political views
- bernie sanders website
- nordic socialism Sanders describes himself as a democratic socialist, supports workplace democracy, and has praised elements of the Nordic model.

FIG. 7

Also try
- 🔍 greatest coaches in history
- 🔍 top college football coaches
- 🔍 college football all-time records Nick Saban received 307 million in 2018 highest paid college in the United States, ding to USA Today's database.

Saban is considered by many to be the greatest coach in college football history. He has won 7 national titles, the most in college football history.

Nick Saban has been referred to as the highest paid public employee in the country. Saban has brought the Alabama football program five national titles and six SEC championships. 

Also try
- 🔍 nick saban high school football
- 🔍 nick saban twitter
- 🔍 current alabama football coaches in the United States, according to USA Today' database. red by many to be the e greatest coach in history. He has won 7 college football history.

Nick Saban has been referred to as the highest paid public employee in the country. Saban has brought the Alabama football program five national titles and six SEC championships. 

FIG. 8

KNOWLEDGE ATTRIBUTES AND PASSAGE INFORMATION BASED INTERACTIVE NEXT QUERY RECOMMENDATION

CROSS-REFERENCE TO RELATED APPLICATIONS

This application claims priority to Indian Patent Application No. 202141047029, filed on Oct. 18, 2021, and entitled "KNOWLEDGE ATTRIBUTES AND PASSAGE INFORMATION BASED INTERACTIVE NEXT QUERY RECOMMENDATION", the entirety of which is incorporated herein by reference.

BACKGROUND

Conventionally, a search engine receives a query from a computing device of a user. The search engine obtains search results based upon the query and transmits a search engine results page (SERP) to the computing device for presentment to the user, where the SERP includes uniform resource locators (URLs) for webpages that are relevant to the query. The SERP may also include suggested queries that are based upon the query and historical queries submitted by other users. The suggested queries tend to be presented at a top of the SERP or a bottom of the SERP when the SERP is presented on a display.

SUMMARY

The following is a brief summary of subject matter that is described in greater detail herein. This summary is not intended to be limiting as to the scope of the claims.

Described herein are various technologies pertaining to generating suggested queries based upon (1) a passage displayed in a search engine results page (SERP) (or a passage displayed on another webpage) and (2) data from a knowledge graph. The technologies described herein understand a user's point of interest and generate suggested queries that are contextually relevant to the passage being shown on the SERP. The technologies described herein help the user to explore an entity referenced in the passage in an intuitive and non-intrusive manner. In essence, the technologies described herein anticipate what a user is interested in and present suggested queries based upon such information. Additionally, the technologies described herein are adaptable to passages of different lengths, from simple one-line sentences to multi-sentence passages.

In example operation, a computing system obtains a passage from an electronic source. The passage references an entity (e.g., a person, a place, an event, etc.). The computing system also obtains an entry for the entity in a knowledge graph. The knowledge graph includes nodes and edges connecting the nodes, where the nodes represent entities or attributes of the entities and where the edges represent relationships between the entities or relationships between the entities and the attributes. As such, the entry for the entity in the knowledge graph includes a portion of the nodes and the edges of the knowledge graph. The computing system generates a plurality of candidate suggested queries based upon text of the passage and the entry for the entity in the knowledge graph. According to embodiments, the computing system utilizes a generative model, such as a transformer model, to generate the plurality of candidate suggested queries. The computing system removes a subset of queries from the plurality of candidate suggested queries based upon relevance criteria, thereby generating a plurality of pruned candidate suggested queries. In an example, the computing system utilizes a machine learning model to classify the plurality of candidate suggested queries as relevant or not relevant to the passage based upon the entry for the entity in the knowledge graph. The computing system ranks the plurality of pruned candidate suggested queries based upon ranking criteria, thereby generating a ranked plurality of pruned candidate suggested queries. In an example, the computing system ranks the plurality of pruned candidate suggested queries based upon previous queries submitted by a plurality of users. The computing systems selects a number (e.g., three) of top-ranked queries from the ranked plurality of pruned candidate suggested queries, thereby generating a plurality of suggested queries that are relevant to the passage.

The computing system receives a query from a user, where the query is related to the entity. In an example, the query is a name of a football coach: "Football Coach X". The computing system obtains a SERP based upon the query and presents the query on a display. The SERP includes uniform resource locators (URLs) of webpages that are relevant to the query and the passage. The passage may be from an online encyclopedia, the knowledge graph, or another website. In an example, the passage is "Coach X is considered to be the greatest coach in college football history. He has won 7 national titles, the most in college football history." In an example, the passage is included in a knowledge card shown on the SERP. The knowledge card includes information about the entity, where at least a portion of the information included in the knowledge card is from the knowledge graph.

The computing system receives an indication that the user has selected the passage shown on the SERP, where the indication includes an identifier for the passage. In an example, the computing system receives the indication when a mouse cursor of a mouse operated by the user hovers over the passage shown on the SERP. Upon receiving the indication, the computing system identifies the plurality of suggested queries related to the passage. Upon identifying the plurality of suggested queries, the computing system presents the plurality of suggested queries in a pop-up graphical element located proximate to the passage in the SERP, where the pop-up graphical element overlays a portion of the SERP. In an example, the plurality of suggested queries include "greatest coaches in history", "top college football coaches", and "college football all time records".

The computing system may receive a second indication that the user has selected a query in the plurality of suggested queries shown on the SERP. In an example, the computing system receives the second indication when the query is clicked via a cursor of a mouse operated by the user. The computing system obtains a second SERP based upon the query in the plurality of suggested queries. The computing system presents the second SERP on the display. Following the example given above, the user selects the "top college football coaches" query, and as such, the second SERP presents information about top college football coaches. The second SERP may include the knowledge card that was previously presented in the SERP or a modified version of the knowledge card, such as one that includes different passages than those in the (original) knowledge card. Alternatively, the second SERP may not include the knowledge card.

The above-described technologies present various advantages over conventional query suggestion technologies, First, unlike conventional query suggestion technologies, the above-described technologies combine knowledge graph mining approaches with generative machine learning techniques in order to surface relevant suggested queries to a user. Second, while conventional query suggestion technologies present suggested queries to a user based upon a query that has been submitted by a user, the above-described technologies present suggested queries that are based upon a passage shown within a SERP. Thus, the above-described technologies surface more relevant queries to a user in comparison to conventional technologies. Third, unlike conventional query suggestion technologies which present suggested queries at a top or a bottom of a SERP when the SERP is presented, the above-described technologies can present suggested queries to a user when a mouse cursor of a mouse operated by the user hovers over a passage shown on the SERP, where the hovering serves as an indicator that the user is interested in the passage. Thus, the above-described technologies present suggested queries in a non-intrusive, intuitive, and user-friendly manner. Fourth, through use of a generative model which generates suggested queries based upon a passage and data from a knowledge graph, the above-described technologies can generate relevant suggested queries, without requiring the suggested queries to have been previously submitted to a search engine by other users. Fifth, as the knowledge graph includes consolidated information about many different entities in a single location, the above-described technologies do need to perform extensive searches of different sources in order to find information to supplement the passages (which are used to generate the suggested queries). Thus, the above-described technologies conserve network and storage resources.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 3A-C illustrate different states of an example search engine results page (SERP) that facilitates serving contextual query-intents to interacting users.

FIGS. 4-8 are example screenshots that illustrate serving contextual query-intents to interacting users.

Figure 1:
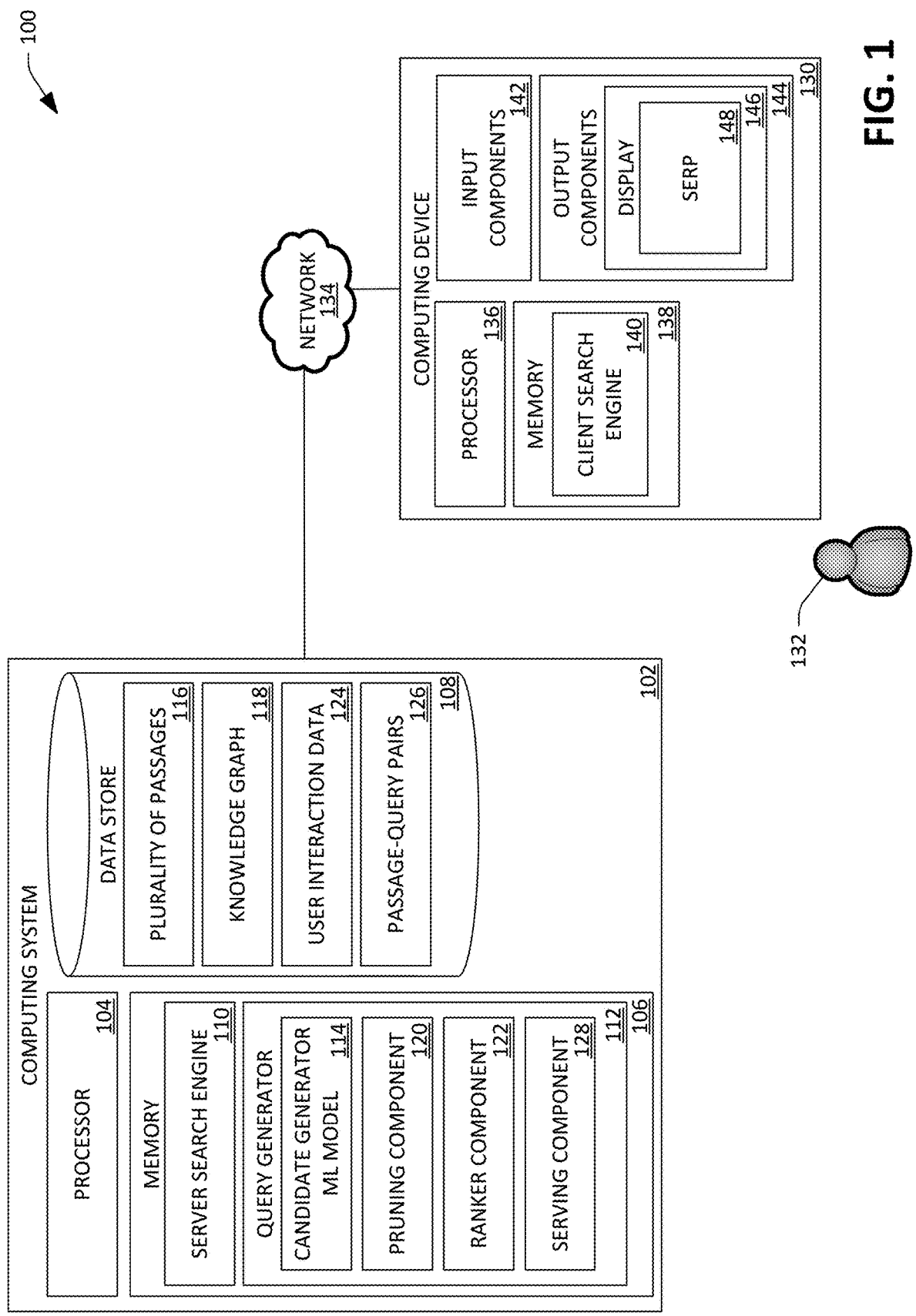
FIG. 1 is a functional block diagram of an example computing environment that facilitates serving contextual query-intents to interacting users.

Various technologies pertaining to serving contextual query-intents (e.g., suggested queries) to interacting users are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

As noted above, conventional search engines recommend queries to a user based upon a query submitted by a user and previously queries submitted by other users. Furthermore, as noted above, conventional search engines tend to present the suggested queries near a top or a bottom of a search engine results page (SERP) for the query, which often tend to be ignored by users.

To address these issues, a computing system that serves contextual query-intents (e.g., suggested queries) to users is described herein. The computing system generates suggested queries based upon a passage that is displayed on a SERP (or a passage displayed on another webpage) for a query (as opposed to the query itself) and thus the computing system tends to suggest more relevant queries to a user. Furthermore, the computing system can present the suggested queries to the user when a mouse cursor of a mouse and/or trackpad of the user hovers over the passage (indicating that the user is interested in the passage) and thus the computing system is better able to present suggested queries to a user when the user is actually interested in seeing suggested queries. Additionally, the computing system utilizes a generative model (e.g., a transformer model) to generate the suggested queries (as opposed to simply identifying popular related queries submitted by other users) and thus the computing system can generate relevant suggested queries even when other users have not previously submitted such suggested queries. Moreover, the computing system utilizes both the passage and data from a knowledge graph in order to generate the suggested queries, which further helps to identify relevant suggested queries.

In example operation, a computing system obtains a passage from an electronic source. The passage references an entity (e.g., a person, a place, an event, etc.). The computing system also obtains an entry for the entity in a knowledge graph. The knowledge graph includes nodes and edges connecting the nodes, where the nodes represent entities or attributes of the entities and where the edges represent relationships between the entities or relationships between the entities and the attributes. As such, the entry for the entity in the knowledge graph includes a portion of the nodes and the edges of the knowledge graph. The computing system generates a plurality of candidate suggested queries based upon text of the passage and the entry for the entity in the knowledge graph. According to embodiments, the computing system utilizes a generative model, such as a transformer model, to generate the plurality of candidate suggested queries. The computing system removes a subset of queries from the plurality of candidate suggested queries based upon relevance criteria, thereby generating a plurality of pruned candidate suggested queries. In an example, the computing system utilizes a machine learning model to classify the plurality of candidate suggested queries as relevant or not relevant to the passage based upon the entry for the entity in the knowledge graph. The computing system ranks the plurality of pruned candidate suggested queries based upon ranking criteria, thereby generating a ranked plurality of pruned candidate suggested queries. In an example, the computing system ranks the plurality of pained candidate suggested queries based upon previous queries submitted by a plurality of users. The computing systems selects a number (e.g., three) of top-ranked queries from the ranked plurality of pruned candidate suggested queries, thereby generating a plurality of suggested queries that are relevant to the passage.

The computing system receives a query from a user, where the query is related to the entity. In an example, the query is a name of a scientist: "Scientist X". The computing system obtains a SERP based upon the query and presents the query on a display. The SERP includes uniform resource locators (URLs) of webpages that are relevant to the query and the passage. The passage may be from an online encyclopedia, the knowledge graph, or another website. In an example, the passage is "Scientist X's most important work is believed to be the study of black holes." In an example, the passage is included in a knowledge card shown on the SERP. The knowledge card includes information about the entity, where at least a portion of the information included in the knowledge card is from the knowledge graph.

The computing system receives an indication that the user has selected the passage shown on the SERP, where the indication includes an identifier for the passage. In an example, the computing system receives the indication when a mouse cursor of a mouse operated by the user hovers over the passage shown on the SERP. Upon receiving the indication, the computing system identifies the plurality of suggested queries related to the passage. Upon identifying the plurality of suggested queries, the computing system presents the plurality of suggested queries in a pop-up graphical element located proximate to the passage in the SERP, where the pop-up graphical element overlays a portion of the SERP. In an example, the plurality of suggested queries include "Scientist X theory of the universe", "black holes explanation", and "black holes in the world."

The computing system may receive a second indication that the user has selected a query in the plurality of suggested queries shown on the SERP. In an example, the computing system receives the second indication when the query is clicked via a cursor of a mouse operated by the user. The computing system obtains a second SERP based upon the query in the plurality of suggested queries. The computing system presents the second SERP on the display. Following the example given above, the user selects the "black holes explanation" query, and the second SERP presents an explanation of black holes. The second SERP may include the knowledge card that was previously presented in the SERP or a modified version of the knowledge card, such as one that includes different passages than those in the (original) knowledge card. Alternatively, the second SERP may not include the knowledge card.

The above-described technologies present various advantages over conventional query suggestion technologies. First, unlike conventional query suggestion technologies, the above-described technologies combine knowledge graph mining approaches with generative machine learning techniques in order to surface relevant suggested queries to a user. Second, while conventional query suggestion technologies present suggested queries to a user based upon a query that has been submitted by a user, the above-described technologies present suggested queries that are based upon a passage shown within a SERP. Thus, the above-described technologies surface more relevant queries to a user in comparison to conventional technologies. Third, unlike conventional query suggestion technologies which present suggested queries at a top or a bottom of a SERP when the SERP is presented, the above-described technologies can present suggested queries to a user when a mouse cursor of a mouse operated by the user hovers over a passage shown on the SERP, where the hovering serves as an indicator that the user is interested in the passage. Thus, the above-described technologies present suggested queries in a non-intrusive, intuitive, and user-friendly manner. Fourth, through use of a generative model which generates suggested queries based upon a passage and data from a knowledge graph, the above-described technologies can generate relevant suggested queries, without requiring the suggested queries to have been previously submitted to a search engine by other users. Fifth, as the knowledge graph includes consolidated information about many different entities in a single location, the above-described technologies do need to perform extensive searches of different sources in order to find information to supplement the passages (which are used to generate the suggested queries). Thus, the above-described technologies conserve network and storage resources.

With reference to FIG. 1, an example computing environment 100 that facilitates serving contextual query-intents (e.g., suggested queries) to interacting users is illustrated. The computing environment 100 includes a computing system 102, According to embodiments, the computing system 102 is a cloud-based computing platform. According to embodiments, the computing system 102 is a server computing device. The computing system 102 includes a processor 104, memory 106, and a data store 108.

According to embodiments, the memory 106 has a server search engine 110 loaded therein. According to other embodiments, the server search engine 110 is included in memory of a second computing system (not shown in FIG. 1). The server search engine 110, when executed by the processor 104 (or another processor), is generally configured (1) receive queries from computing devices of users; (2) search an index based upon the queries; (3) generate search engine results pages (SERPs) based upon searches of the index; and (4) deliver the SERPs to computing devices of the users, where the SERPs are presented on displays of the computing devices.

The memory 106 includes a query generator 112. As will be described in greater detail below, the query generator 112, when executed by the processor 104, is configured to identify and serve contextual query-intents to interacting users. The query generator 112 includes a (computer-implemented) candidate generator machine learning (ML) model 114. As will be described in greater detail below, the candidate generator ML model 114 is configured to generate a plurality of candidate suggested queries related to a passage. In an example, the computing system 102 (or another computing system) trains the candidate generator ML model 114 based upon a plurality of passages 116 and data from a knowledge graph 118, The plurality of passages 116 and the knowledge graph 118 may be stored in the data store 108 (or another data store).

According to embodiments, the candidate generator ML model 114 is a generative ML model. According to embodiments, the candidate generator ML model 114 is or includes a transformer model. A decoder of the transformer model takes a passage and an entry for an entity in the knowledge graph 118 as input. The decoder outputs a plurality of candidate suggested queries based upon the input.

The plurality of passages 116 are obtained from a plurality of electronic sources. According to embodiments, the plurality of passages 116 are obtained from web pages that are included in SERPs. According to embodiments, the plurality of passages 116 are obtained from an online encyclopedia.

According to embodiments, the plurality of passages 116 are obtained from news articles. Entities referenced in the passage may include people, places, things, ideas, and/or events. A passage in the plurality of passages 116 may include a part of a sentence, a phrase, or several sentences.

The knowledge graph 118 includes nodes and edges connecting the nodes. The nodes included in the knowledge graph 118 represent entities or attributes of the entities. The edges included in the knowledge graph 118 represent relationships between the entities or relationships between the entities and the attributes. The entities represented by the nodes in the knowledge graph 118 may include people, places, things, ideas, and/or events. A first node representing an entity that is connected to a second node representing a second entity or an attribute of the entity by an edge may be considered to be an entry for the entity in the knowledge graph 118. In an example, the first node represents a scientist, the second node represents a book, and the edge represents an "authored" relationship, that is, the scientist authored the hook. In another example, the first node represents the scientist, the second node is a date attribute, and the edge represents a "born" relationship, that is, the scientist was born on the date. It is contemplated that the knowledge graph 118 includes entries for entities that are referenced in the plurality of passages 116.

The query generator 112 includes a pruning component 120 that is configured to prune (e.g., remove) queries from the plurality of candidate suggested queries generated by the candidate generator ML model 114 based upon relevance criteria. In an example, the pruning component 120 is or includes a machine learning model that classifies the plurality of candidate suggested queries as relevant or not relevant to a passage (which references an entity) based upon an entry for the entity in the knowledge graph 118. In this manner, the pruning component 120 removes candidate suggested queries generated by the candidate generator ML model 114 that are not relevant to a given passage.

The query generator 112 includes a ranker component 122 that is configured to rank the plurality of pruned candidate suggested queries based upon ranking criteria. In an example, the ranking criteria is user interaction data 124 that is stored in the data store 108. The user interaction data 124 includes queries submitted by users and indications of uniform resource locators (URLs) presented on SERPs that the users selected, where the SERPs were generated based upon the queries.

For a passage in the plurality of passages 116, the query generator 112 generates a plurality of candidate suggested queries for the passage using the candidate generator ML model 114. The query generator 112 removes a subset of queries from the plurality of candidate suggested queries using the pruning component 120, thereby generating a plurality of pruned candidate suggested queries. The query generator 112 ranks the plurality of pruned candidate suggested queries using the ranker component 122, thereby generating a ranked plurality of pruned candidate suggested queries. The query generator 112 selects a number of top-ranked queries from the ranked plurality of pruned candidate suggested queries, thereby generating a plurality of suggested queries for the passage. In an example, the query generator 112 selects the top 3 queries from the ranked plurality of pruned candidate suggested queries. The query generator 112 stores an identifier for the passage and the plurality of suggested queries for the passage as part of passage-query pairs 126 stored in the data store 108. Although not depicted in FIG. 1, it is to be understood that the data store 108 may store passage-query pairs for many different passages.

The query generator 112 further includes a serving component 128. The serving component 128 is generally configured to deliver a plurality of suggested queries for a given passage to computing devices of users. The serving component 128 may cause the plurality of suggested queries to be included in a SERP prior to the SERP being presented or the serving component 128 may transmit the plurality of suggested queries to a computing device for presentment within the SERP upon the passage in the SERP being selected.

The computing environment 100 further includes a computing device 130 operated by a user 132. In an example, the computing device 130 is a desktop computing device, a laptop computing device, a tablet computing device, a smartphone, or a video game console. The computing device 130 is in communication with the computing system 102 by way of a network 134.

The computing device 130 includes a processor 136 and memory 138. The memory 138 includes a client search engine 140. The client search engine 140 may execute within a web browser (not shown in FIG. 1) on the computing device 130. The client search engine 140, when executed by the processor 136, is generally configured to (1) transmit queries to the server search engine 110; (2) receive search results from the server search engine 110; and (3) present the search results to the user 132. The search results may be in the form of a SERP. The server search engine 110 and the client search engine 140 may be collectively referred to as "a search engine." According to embodiments, the search engine is Microsoft® Bing.

The computing device 130 includes input components 142 that enable the computing device 130 to receive input from the user 132. The input components 142 may include a mouse, a keyboard, a trackpad, a scroll wheel, a microphone, a camera, a video camera, a controller, and/or a touchscreen. The computing device 130 further includes output components 144 that enable the computing device 130 to output information to the user 132. The output components 144 include a display 146. The display 146 may be a touchscreen display. The client search engine 140 presents a SERP 148 on the display 146. The output components 144 may also include a speaker and/or a haptic feedback device (not shown in FIG. 1).

Figure 2:
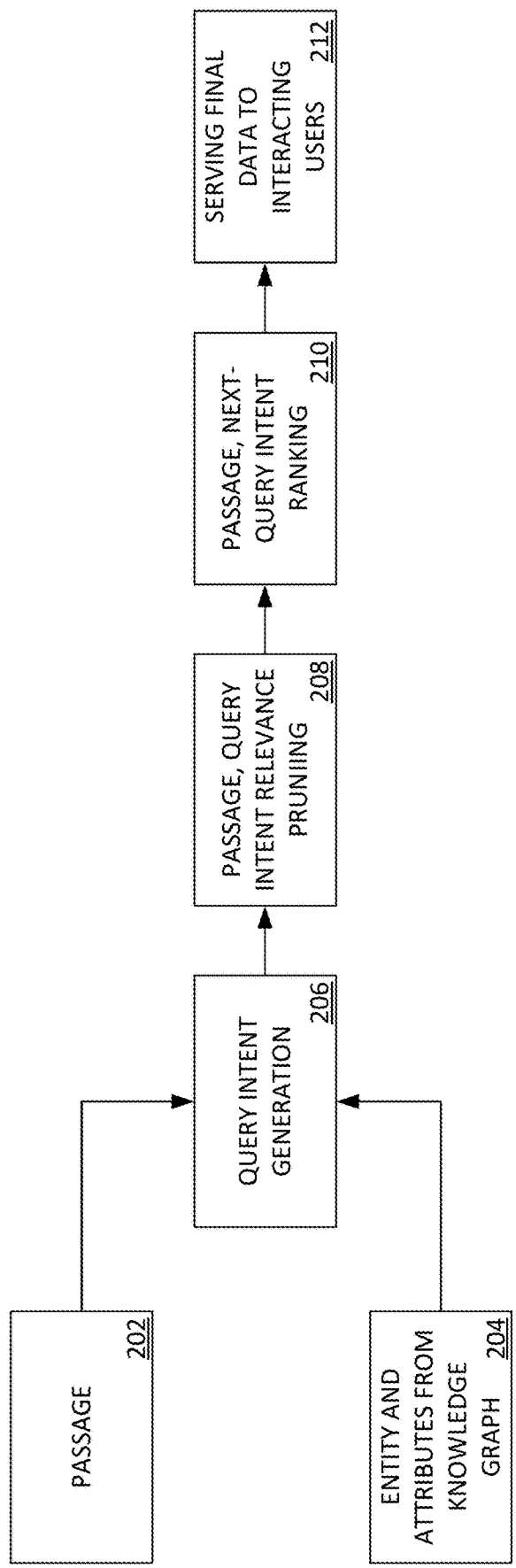
FIG. 2 illustrates an example pipeline that facilitates serving contextual query-intents to interacting users.

Referring now to FIG. 2, an example pipeline 200 that facilitates serving contextual query-intents (e.g., suggested queries) to interacting users is illustrated. The steps illustrated in the pipeline 200 are performed by the query generator 112. At step 202, the query generator 112 obtains a passage that references an entity from the plurality of passages 116. At step 204, the query generator 112 obtains data about the entity from the knowledge graph 118 using the passage. At step 206, the query generator 112 generates query intents (e.g., a plurality of candidate suggested queries) based upon text of the passage and the data about the entity from the knowledge graph 118.

At step 208, the query generator 112 prunes the plurality of candidate suggested queries based upon relevance criteria, thereby generating a plurality of pruned candidate suggested queries. In an example, the query generator 112, by way of the pruning component 120, removes a subset of queries from the plurality of candidate suggested queries based upon relevance criteria. For instance, the pruning component 120 classifies each of the plurality of candidate suggested queries as relevant or not relevant to the passage based upon data from the knowledge graph 118. At step 210, the query generator 112, by way of the ranker component 122, ranks the plurality of pruned candidate suggested queries based upon ranking criteria to generate a ranked plurality of pruned candidate suggested queries. In example, the ranking criteria is the user interaction data 124. The query generator 112 selects a number of top-ranked queries (e.g., top three) from the ranked plurality of pruned candidate suggested queries to generate a plurality of suggested queries for the passage. The query generator 112 saves an identifier for the passage and the plurality of suggested queries for the passage as part of the passage-query pairs 126. At step 212, the query generator 112, via the serving component 128, causes the plurality of suggested queries to be presented to the user 132 when the passage is selected by the user 132.

Referring back to FIG. 1, example operation of the computing environment 100 is now set forth. The client search engine 140 transmits a query to the server search engine 110. The query is related to an entity that has an entry in the knowledge graph 118. In an example, the entity is a politician. In an example, the client search engine 140 receives the query as manual input from the user 132 and the client search engine 140 transmits the query to the server search engine 110. The server search engine 110 executes a search over an index (not shown in FIG. 1) based upon the query to obtain search results. The server search engine 110 generates the SERP 148 based upon the search results. In an example, the SERP 148 includes, inter alia, the query, URLs of webpages, and a knowledge card. The knowledge card includes data from the entry for the entity in the knowledge graph 118. The knowledge card also includes at least one passage that relates to the entity. The server search engine 110 transmits the SERP 148 to the client search engine 140, whereupon the client search engine 140 presents the SERP 148 on the display 146.

Figure 3B:
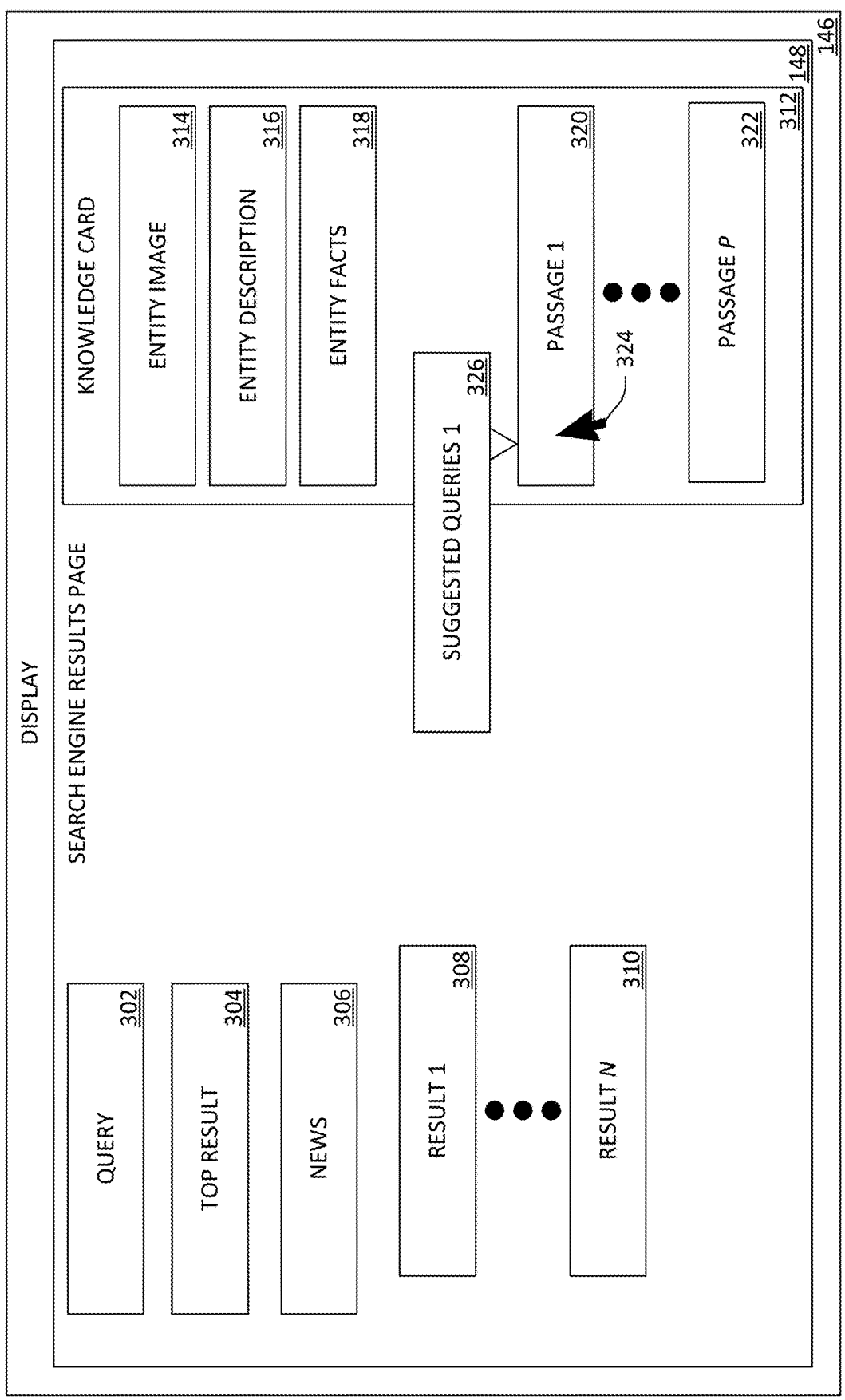

Turning now to FIG. 3A, an example of the SERP 148 is illustrated. The client search engine 140 presents the SERP 148 on the display 146 of the computing device 130. The SERP 148 includes the query 302 (received as input from the user 132). In an example, the query is a name of the politician that has the entry in the knowledge graph 118. The SERP 148 further includes a top result 304, where the top result 304 includes a URL that the server search engine 110 has determined to be most relevant to the query 302, as well as a description of the URL. The SERP 148 may include news 306 about the entity referenced in the query 302. In an example, the news 306 includes a news story about legislation that is being sponsored by the politician. In addition to the top result 304, the SERP 148 includes a first result 308 and an Nth result 310, where N is a positive integer greater than one (collectively, "the plurality of results 308-310"). Each result in the plurality of results 308-310 may include a URL of a webpage, a title of a webpage, and a description of the webpage.

The SERP 148 includes a knowledge card 312. The knowledge card 312 includes information about the entity referenced in the query 302, where at least some of the information in the knowledge card 312 is from the knowledge graph 118. The knowledge card 312 may include an entity image 314, where the entity image 314 is an image of the entity or an image related to the entity. In an example where the entity is a politician, the entity image 314 is an image of the politician. The knowledge card 312 includes an entity description 316 that describes the entity. In an example where the entity is a politician, the entity description 316 describes the politician. The entity description 316 may be from the knowledge graph 118, an online encyclopedia, or another website. The knowledge card 312 may include entity facts 318 about the entity. The entity facts 318 may be from the knowledge graph 118, an online encyclopedia, or another website. In an example where the entity is a politician, the facts include a political party of the politician, a date of birth of the politician, an office which the politician holds, etc.

The knowledge card 312 includes a first passage 320 that relates to the entity referenced in the query 302, where the first passage 320 is included in the plurality of passages 116. The first passage 320 may include a phrase, a single sentence, or several sentences. In an example, the first passage 320 is "Politician X began his electoral political career in 1986 as a member of Party Y, which originated as an anti-war movement." The knowledge card 312 may further include a Pth passage 322, where the Pth passage 322 is included in the plurality of passages 116 and where P is a positive integer greater than one.

Turning now to FIG. 313, a cursor 324 selects the first passage 320. According to embodiments, the user 132 moves a mouse such that the cursor 324 hovers over the first passage 320. According to other embodiments, the user 132 clicks the mouse when the cursor 324 is located over the first passage 320. According to other embodiments in which the display 146 is a touchscreen display, the user 132 touches the first passage 320 that is presented on the touchscreen display.

When the first passage 320 is selected, the client computing device 130 presents a first plurality of suggested queries 326 in a pop-up graphical element located proximate to the first passage 320 in the SERP 148, where the first plurality of suggested queries 326 are generated by the query generator 112 based upon the first passage 320 and data in the knowledge graph 118 (described above). The pop-up graphical element overlays a portion of the SERP 148. In an example, the first plurality of suggested queries 326 include three queries that are related to a politician referenced in the first passage 320. In an example, the three queries include "Politician X biography", "Politician X political affiliation", and "Politician X political views."

According to some embodiments, the server search engine 110 provides the SERP 148 to the query generator 112 prior to transmitting the SERP to the client search engine 140. The query generator 112, via the serving component 128, identifies the first passage 320 in the SERP 148. The query generator 112 executes a search over the passage-query pairs 126 stored in the data store 108 based upon an identifier for the first passage 320. The search produces search results, where the search results include a passage-query pair corresponding to the first passage 320. The passage-query pair includes the identifier for the first passage 320 and the first plurality of suggested queries 326. The query generator 112 causes the first plurality of suggested queries 326 to be included in the SERP 148, where the SERP 148 includes code that causes the first plurality of suggested queries 326 to initially be hidden from display when the SERP 148 is initially presented on the display 146. The query generator 112 provides the SERP 148 (with the first plurality of suggested queries 326 and the code) to the server search engine 110. The server search engine 110 transmits the SERP 148 (with the first plurality of suggested queries 326 and the code) to the client search engine 140. When the cursor 324 hovers over the first passage 320 shown on the SERP 148, the code causes the first plurality of suggested queries 326 to be displayed. When the cursor 324 is not hovering over the first passage 148, the code causes the first plurality of suggested queries 326 to be hidden from display.

According to other embodiments, the first plurality of suggested queries 326 are not initially included in the SERP 148 when the client search engine 140 presents the SERP 148 on the display 146. When the cursor 324 hovers over the first passage 320, the client search engine 140 transmits an indication to the query generator 112, wherein the indication includes an identifier for the first passage 320. Upon receiving the indication, the query generator 112 executes a search over the passage-query pairs 126 stored in the data store 108 based upon the identifier for the first passage 320. The search produces search results, where the search results include a passage-query pair corresponding to the first passage 320. The passage-query pair includes the identifier for the first passage 320 and the first plurality of suggested queries 326. The query generator 112 transmits the first plurality of suggested queries 326 to the client search engine 140, whereupon the client search engine 140 presents the first plurality of suggested queries 326 on the display 146 while the cursor 324 hovers over the first passage 320.

The client search engine 140 may receive a selection of a query in the first plurality of suggested queries 326 as input from the user 132. In an example, the client search engine 140 receives an indication that the user 132 has clicked on the query in the first plurality of suggested queries 326. Upon receiving the indication, the client search engine 140 transmits the query (in the first plurality of suggested queries 326) to the server search engine 110. The server search engine 110 executes a search over an index (described above) based upon the query (in the first plurality of suggested queries 326). The server search engine 110 generates a second SERP based upon the results for the query (in the first plurality of suggested queries 326. The server search engine 110 transmits the second SERP to the client search engine 140), whereupon the client search engine 140 presents the second SERP on the display 146. The client search engine 140 may remove the SERP 148 from the display 146 when the second SERP is presented on the display 146. Alternatively, the client search engine 140 may present the second SERP in a window presented on the display 146 that is separate from a window presenting the SERP 148. Alternatively, the client search engine 140 may present the second SERP in a separate tab of a web browser that is separate from a tab displaying the SERP 148. According to embodiments, the second SERP includes the knowledge card 312 (or another knowledge card).

Figure 3C:
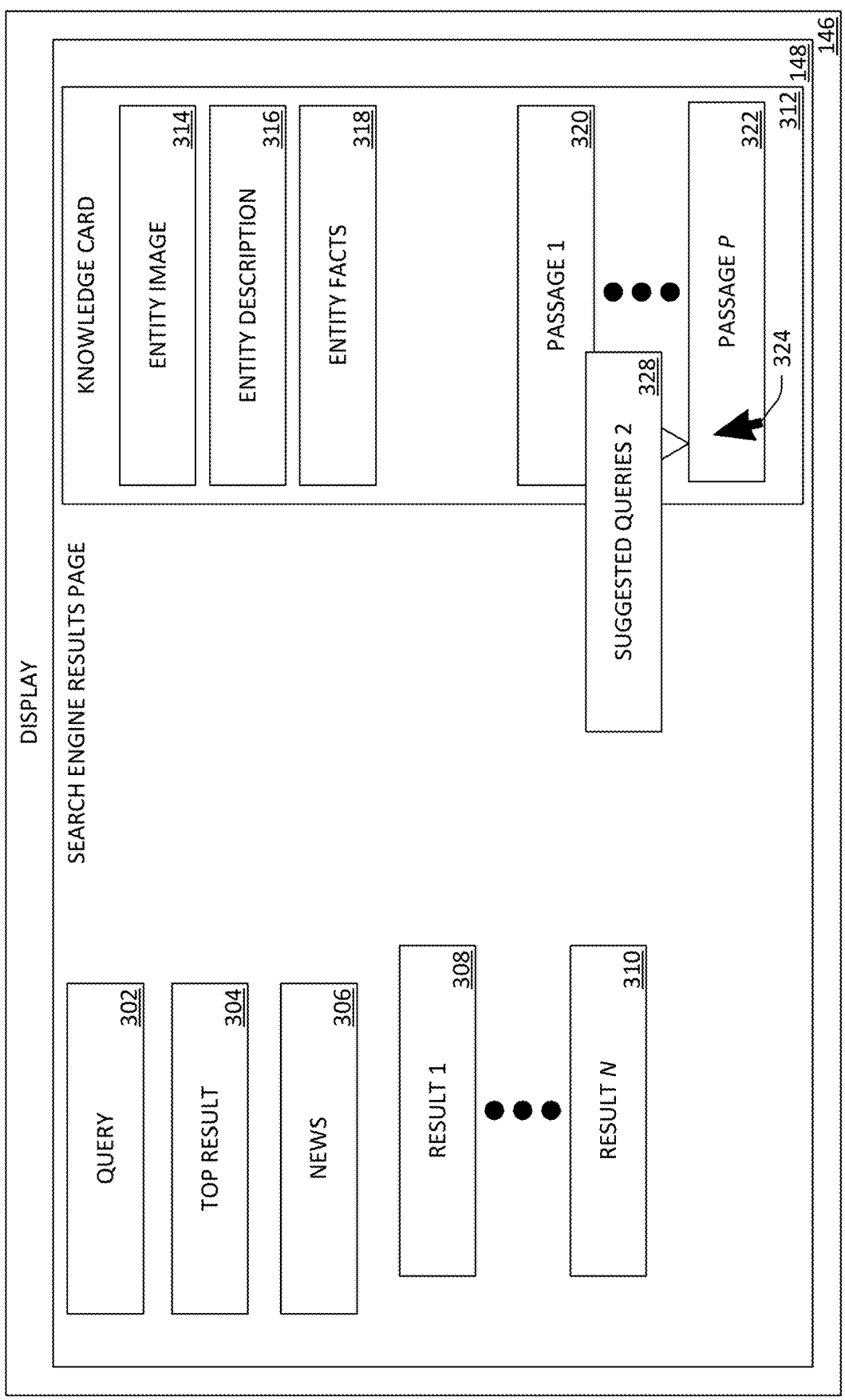

Turning now to FIG. 3C, the cursor 324 selects the Pth passage 322. When the Pth passage 322 is selected, the client computing device 130 presents a second plurality of suggested queries 328 in a second a pop-up graphical element located proximate to the second passage 322 in the SERP 148, where the second plurality of suggested queries 328 are generated by the query generator 112 based upon the Pth passage 322 and data in the knowledge graph 118 (in a manner similar to that described above with respect to the first passage 320). The second a pop-up graphical element overlays a portion of the SERP 148. As illustrated in FIG. 3C, the client search engine 140 may remove the pop-up graphical element that includes the first plurality of suggested queries 326 from the display 146 when the cursor 324 no longer selects the first passage 320.

Figure 4:
Figure 5:

FIGS. 4-8 include example screenshots that illustrate serving contextual query-intents to interacting users. FIG. 4 illustrates a screenshot 400 of a portion of a SERP for "Stephen Hawking." The screenshot 400 includes a knowledge card and passages related to "Stephen Hawking." FIG. 5 illustrates a screenshot 500 of the portion of the SERP in FIG. 4 after a mouse cursor hovers over a passage on the SERP that reads "Stephen Hawking worked on the physics of black holes. He also wrote best-selling books, the most famous of which was A Brief History of Time: From the Big Bang to Black Holes (1988)." The screenshot 500 includes a plurality of suggested queries (generated and identified by the query generator 112) related to the passage: "stephen hawking book summary", "stephen hawking books list", and "stephen hawking theory". Notably, none of the plurality of suggested queries are directly answered in the passage, but such queries are a logical extension of the passage, and the user 132 is likely to engage with one or more of them.

Figure 6:
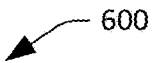

FIG. 6 illustrates a screenshot 600 of a portion of a SERP for "Bernie Sanders." The screenshot 600 includes a knowledge card and passages related to "Bernie Sanders." FIG. 7 illustrates a screenshot 700 of the portion of the SERP in FIG. 6 after a mouse cursor hovers over a first passage on the portion of the SERP that reads "Sanders began his electoral political career in 1971 as a member of the Liberty Union Party, which originated in the anti-war movement and the People's Party" and after the mouse cursor hovers over a second passage on the portion of the SERP that reads "Sanders describes himself as a democratic socialist, supports workplace democracy, and has praised elements of the Nordic model." The screenshot 700 includes a first plurality of suggested queries (generated and identified by the query generator 112) related to the first passage: "bernie sanders biography", "bernie sanders political affiliation", and "bernie sanders political views". The screenshot 700 includes a second plurality of suggested queries (generated and identified by the query generator 112) related to the second passage: "bernie sanders political views", "bernie sanders website", and "nordic socialism."

FIG. 8 illustrates a screenshot 800 that includes a portion of a SERP for "Nick Saban" including: passages from a knowledge card that are related to Nick Saban, a first plurality of suggested queries (generated and identified by the query generator 112) related to a first passage on the portion of the SERP, and a second plurality of suggested queries (generated and identified by the query generator 112) related to a second passage on the portion of the SERP.

Although the above-described technologies have been described in the context of a SERP, other possibilities are contemplated. According to embodiments, the query generator 112 generates suggested queries for a passage that is shown on a web page that is not a SERP, where the passage references an entity that has a corresponding entry in the knowledge graph 118.

Figure 9:
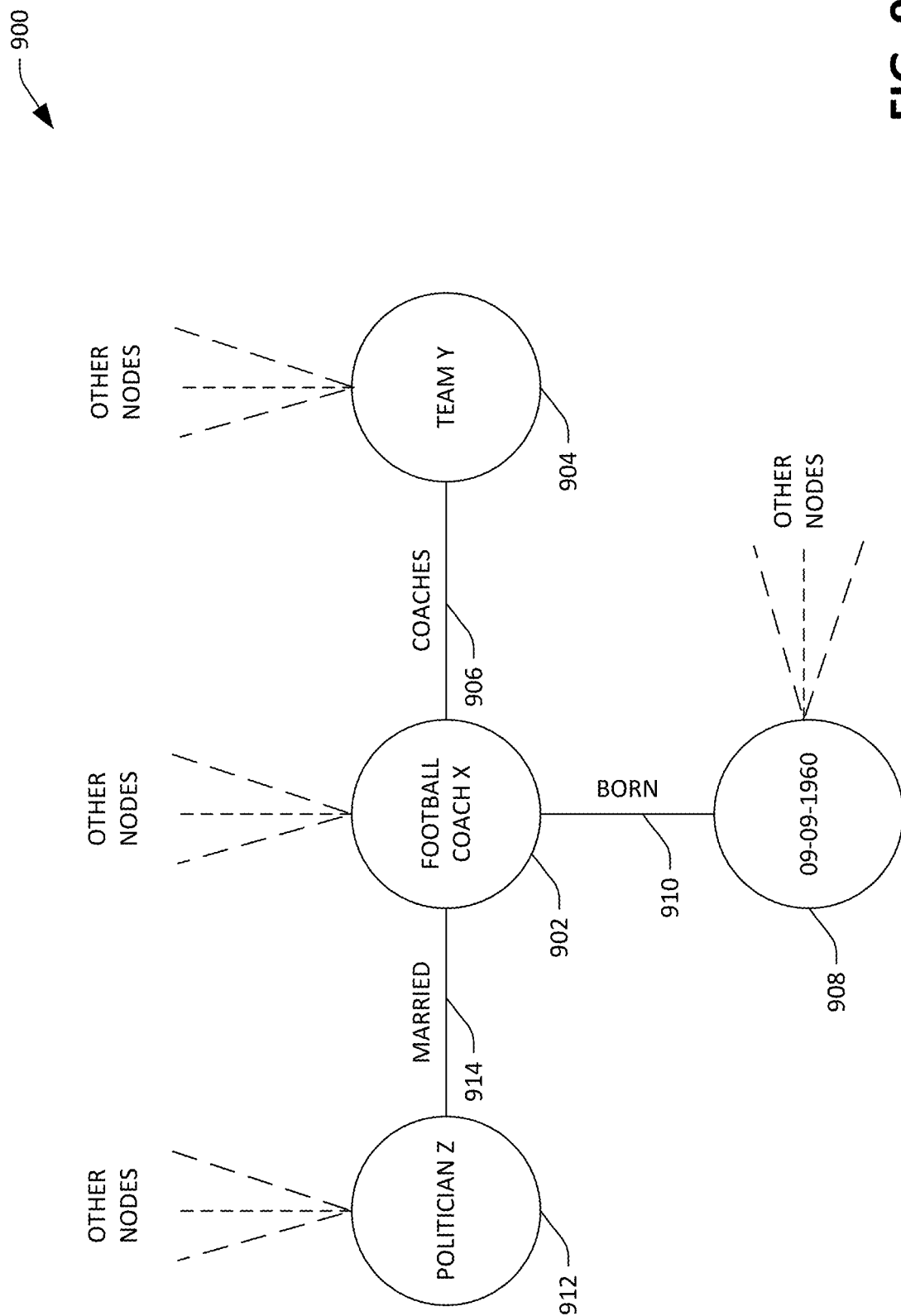
FIG. 9 is an illustration of an example knowledge graph.

Referring now to FIG. 9, an example knowledge graph 900 is illustrated. The knowledge graph 900 may be or include the knowledge graph 118 or the knowledge graph 118 may be or include the knowledge graph 900. The knowledge graph 900 includes a first node 902 that represents "Football Coach X". The first node 902 is connected to a second node 904 via a first edge 906, where the second node 904 represents "Team Y". The first edge 906 includes criteria that indicates a "coaches" relationship, that is, "Football Coach X" coaches "Team Y." The knowledge graph 900 includes a third node 908 that is connected to the first node 902 via a second edge 910, where the third node 908 represents a date ("Sep. 9, 1960"). The second edge 910 includes criteria that indicates a "born" relationship, that is, "Football Coach X" was born on Sep. 9, 1960". The knowledge graph 900 includes a fourth node 912 that is connected to the first node 902 via a third edge 914, where the fourth node 912 represents "Politician Z". The third edge 914 includes criteria that indicates a "married" relationship, that is, "Politician Z" is married to "Football Coach X."

The query generator 112 may utilize the data in the knowledge graph 900 along with a passage in order to generate suggested queries for the passage. In an example, the query generator 112 extracts data that indicates that "Football Coach X" is married to "Politician Z" and provides such data and a passage that reference "Football Coach X" to a transformer model, whereupon the transformer model generates candidate) suggested queries based upon the data and the passage.

Although the knowledge graph 900 is depicted as including four nodes and three edges, it is to be understand that the knowledge graph may include more than four nodes and three edges. Furthermore, it is to be understood that each node may be connected to many different nodes. It is to be understood that the nodes and edges in the knowledge graph 900 may include metadata that enables information about the entities represented in the knowledge graph 900 to be accessed. Moreover, it is to be understood that the query generator 112 may utilize a graph searching algorithm in order to find and extract information from the nodes and the edges of the knowledge graph 900.

Figure 10:
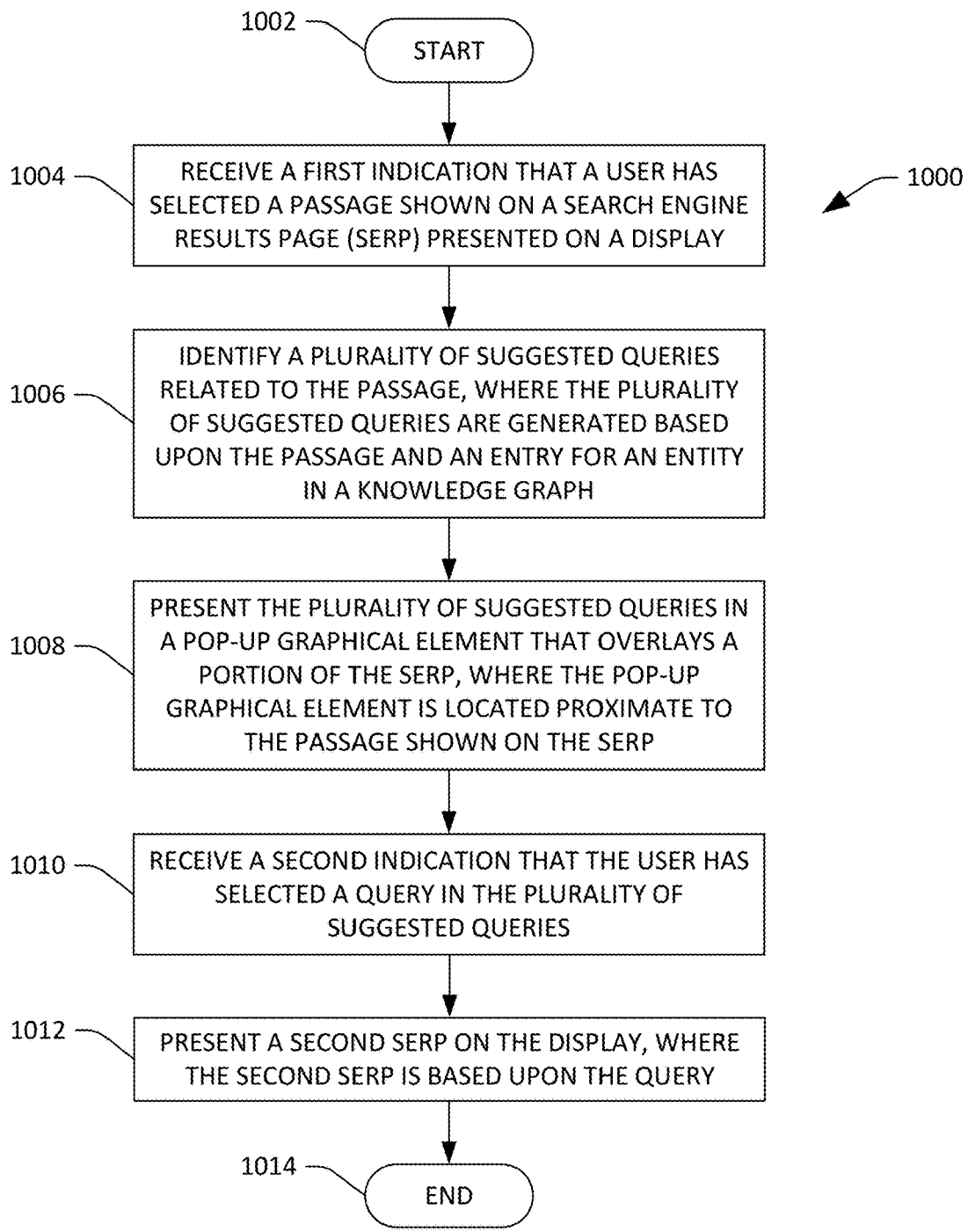
FIG. 10 is a flow diagram that illustrates an example methodology performed by a computing system that FIG. 11 illustrates an example computing device.

FIG. 10 illustrates an example methodology relating to serving contextual query-intents to interacting users. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 10, a methodology 1000 executed by a computing system that facilitates serving contextual query-intents to interacting users is illustrated. The methodology 1000 begins at 1002, and at 1004, the computing system receives a first indication that a user has selected a passage shown on a search engine results page (SERP) presented on a display. At 1006, upon receiving the indication, the computing system identifies a plurality of suggested queries related to the passage, where the plurality of suggested queries are generated based the passage and an entry for an entity in a knowledge graph. At 1008, upon identifying the plurality of suggested queries, the computing system presents the plurality of suggested queries in a pop-up graphical element that overlays a portion of the SERP, where the pop-up graphical element is located proximate to the passage shown on the SERP. At 1010, the computing system receives a second indication that the user has selected a query in the plurality of suggested queries. At 1012, upon receiving the second indication, the computing system presents a second SERP on the display, where the second SERP is based upon the query. The methodology 1000 concludes at 1014.

Figure 11:
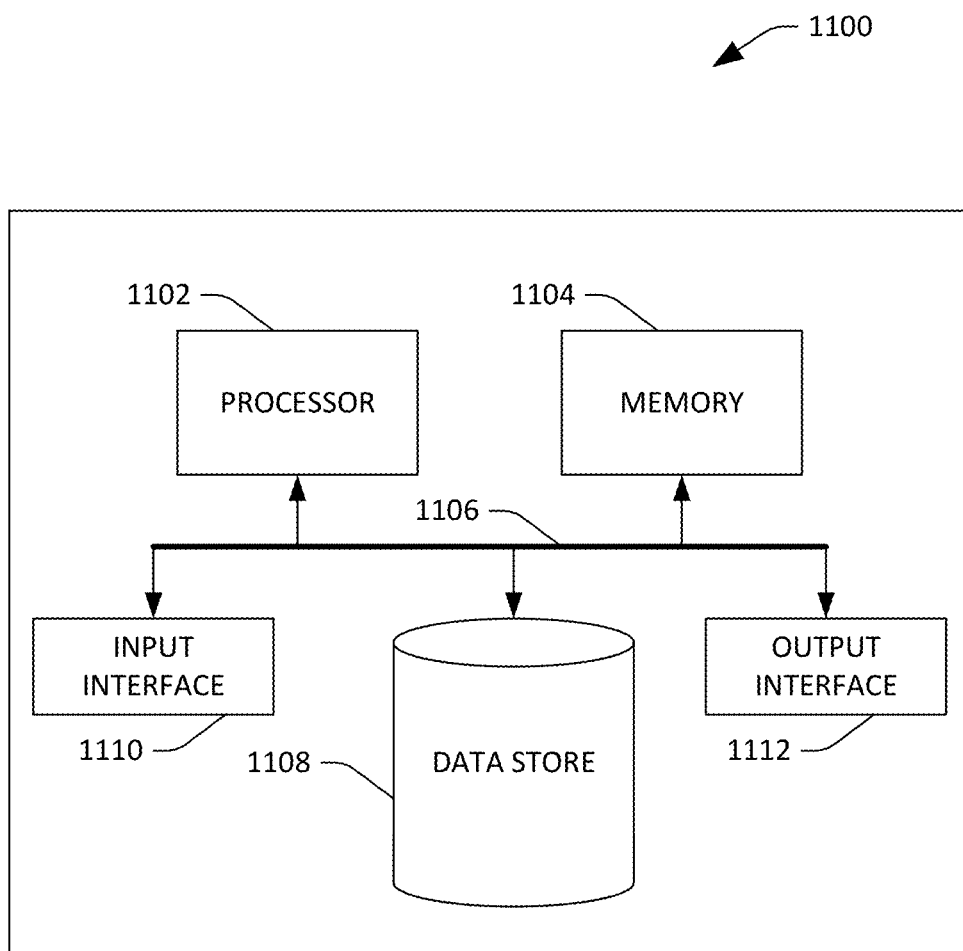

Referring now to FIG. 11, a high-level illustration of an example computing device 1100 that can be used in accordance with the systems and methodologies disclosed herein is illustrated. For instance, the computing device 1100 may be used in a system that facilitates serving contextual query-intents to interacting users. By way of another example, the computing device 1100 can be used in a system that displays a SERP on a display. The computing device 1100 includes at least one processor 1102 that executes instructions that are stored in a memory 1104, The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store knowledge graphs, passages, user interaction data, passage-query pairs, SERPs, etc.

The computing device 1100 additionally includes a data store 1108 that is accessible by the processor 1102 by way of the system bus 1106. The data store 1108 may include executable instructions, knowledge graphs, passages, user interaction data, passage-query pairs, SERPs, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

The present disclosure relates to serving contextual query-intents to interacting users according to at least the following examples:

(A1) In one aspect, some embodiments include a method (e.g., 1000) executed by a processor (e.g., 104) of a computing system (e.g., 102). The method includes receiving (e.g., 1004) a first indication that a user (e.g., 132) has selected a passage (e.g., 320) shown on a search engine results page (SERP) (e.g., 148) presented on a display (e.g., 146). The method further includes upon receiving the indication, identifying (e.g., 1006) a plurality of suggested queries (e.g., 326) related to the passage, where the plurality of suggested queries are generated based upon the passage and an entry for an entity in a knowledge graph (e.g., 118, 900). The method additionally includes upon identifying the plurality of suggested queries, presenting (e.g., 1008) the plurality of suggested queries in a pop-up graphical element that overlays a portion of the SERP, where the pop-up graphical element is located proximate to the passage shown on the SERP. The method also includes receiving (e.g., 1010) a second indication that the user has selected a query in the plurality of suggested queries. The method further includes upon receiving the second indication, presenting (e.g., 1012) a second SERP on the display, wherein the second SERP is based upon the query.

(A2) In some embodiments of the method of A1, the passage references the entity.

(A3) In some embodiments of any of the methods of A1-A2, the SERP is removed from the display when the second SERP is presented on the display.

(A4) In some embodiments of any of the methods of A1-A3, the passage is located in a knowledge card (e.g., 312) shown on the SERP, where a portion of information displayed in the knowledge card is from the knowledge graph.

(A5) In some embodiments of any of the methods of A1-A4, the entity is one of a person, a place, or an event.

(A6) In some embodiments of any of the methods of A1-A5, the plurality of suggested queries are ranked based upon ranking criteria, where the ranking criteria includes queries submitted by a plurality of users and selections of uniform resource locators (URLs) on SERPs by the plurality of users (e.g., 124), where the SERPs are based upon the queries.

(B1) In another aspect, some embodiments include a computing system e.g., 102) that includes a processor (e.g., 104) and memory (e.g., 106). The memory stores instructions that, when executed by the processor, cause the processor to perform any of the methods described herein (e.g., any of A1-A6).

(C1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of A1-A6).

(D1) In another aspect, some embodiments include a method executed by a computing system (e.g., 102) that includes a processor (e.g., 104) and memory (e.g., 106). The method includes receiving an indication that a user (e.g., 132) has selected a passage (e.g., 320) shown on a search engine results page (SERP) (e.g., 148) presented on a display (e.g., 146). The passage references an entity. The method further includes upon receiving the indication, identifying a plurality of suggested queries (e.g., 326) related to the passage, where the plurality of suggested queries are generated based upon the passage and an entry for the entity in a knowledge graph (e.g., 118, 900). The method additionally includes upon identifying the plurality of suggested queries, presenting the plurality of suggested queries in a pop-up graphical element that overlays a portion of the SERP, where the pop-up graphical element is located proximate to the passage shown on the SERP.

(D2) In some embodiments of the method of D1, the passage is selected when a mouse cursor (e.g., 324) of a mouse hovers over the passage shown on the SERP.

(D3) In some embodiments of any of the methods of D1-D2, the indication comprises an identifier for the passage and the plurality of suggested queries are identified based upon the identifier for the passage.

(D4) in some embodiments of any of the methods of D1-D3, the passage is located in a knowledge card shown on the SERP. The method further includes receiving a second indication that the user has selected a query in the plurality of suggested queries. The method additionally includes obtaining a second SERP based upon the query. The method also includes presenting the second SERP on the display. The second SERP includes the knowledge card.

(D5) In some embodiments of any of the methods of D1-D4, the method further includes prior to receiving the indication that the user has selected the passage, receiving a query. The method additionally includes obtaining the SERP based upon the query. The method also includes presenting the SERP on the display.

(D6) In some embodiments of any of the methods of D1-D5, the method further includes receiving a second indication that the user has selected a query in the plurality of suggested queries. The method additionally includes obtaining a second SERP based upon the query. The method also includes presenting the second SERP on the display.

(D7) In some embodiments of any of the methods of D1-D6, the method further includes prior to receiving the indication, generating a plurality of candidate suggested queries based upon the passage and the entry for the entity in the knowledge graph. The method additionally includes removing a subset of queries from the plurality of candidate suggested queries based upon relevance criteria, thereby generating a plurality of pruned candidate suggested queries. The method also includes ranking the plurality of pruned candidate suggested queries based upon ranking criteria, thereby generating a ranked plurality of pruned candidate suggested queries. The method further includes selecting a number of top-ranked queries from the ranked plurality of pruned candidate suggested queries, thereby generating the plurality of suggested queries.

(D8) In some embodiments of any of the methods of D1-D7, the method further includes subsequent to presenting the plurality of suggested queries in the pop-up graphical element, receiving a second indication that the user has selected a second passage (e.g., 322) shown on the SERP. The method additionally includes upon receiving the second indication, identifying a second plurality of suggested queries (e.g., 328) related to the second passage, where the second plurality of suggested queries are generated based upon the second passage and the entry for the entity in the knowledge graph. The method also includes upon identifying the second plurality of suggested queries, presenting the second plurality of suggested queries in a second pop-up graphical element that overlays a second portion of the SERP, where the second pop-up graphical element is located proximate to the second passage shown on the SERP.

(D9) in some embodiments of the method of D8, the pop-up graphical element is removed from the SERP when the passage is no longer selected.

(D10) In some embodiments of any of the methods of D1-D9, the plurality of suggested queries are included in the SERP, the plurality of suggested queries are initially hidden from display in the SERP, and the plurality of suggested queries are presented in the pop-up graphical element when a cursor (e.g., 324) hovers over the passage in the SERP.

(D11) In some embodiments of any of the methods of D1-D10, the plurality of suggested queries are generated by way of a computer-implemented transformer model that takes the passage and the entry for the entity in the knowledge graph as input, wherein the plurality of suggested queries are identified based upon output of the computer-implemented transformer model.

(E1) In another aspect, some embodiments include a computing system (e.g., 102) including a processor (e.g., 104) and memory (e.g., 106). The memory stores instructions that, when executed by the processor, cause the processor to perform any of the methods described herein (e.g., any of D1-D11).

(F1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of D1-D11).

(G1) in another aspect, some embodiments include a method performed by a computing system (e.g., 102) that includes a processor (e.g., 104). The method includes receiving an indication from a computing device (e.g., 130) of a user (e.g., 132) that the user has selected a passage (e.g., 320) shown on a search engine results page (SERP) (e.g., 148) presented on a display (e.g., 146) of the computing device, wherein the computing device is in network (e.g., 134) communication with the computing system. The method further includes upon receiving the indication, identifying a plurality of suggested queries (e.g., 326) related to the passage, wherein the plurality of suggested queries are generated based upon the passage and an entry for an entity in a knowledge graph (e.g., 118, 900). The method additionally includes upon identifying the plurality of suggested queries, transmitting the plurality of suggested queries to the computing device, where the plurality of suggested queries are presented in a pop-up graphical element that overlays a portion of the SERP, wherein the pop-up graphical element is located proximate to the passage shown on the SERP.

(G2) In some embodiments of the method of G1, the method further includes receiving a second indication from the computing device that the user has selected a query in the plurality of suggested queries, where the second indication includes the query. The method additionally includes obtaining a second SERP based upon the query. The method also includes transmitting the second SERP to the computing device, where the second SERP is presented on the display.

(G3) In some embodiments of any of the methods of G1-G2, the knowledge graph comprises nodes (e.g., 902, 904, 908, 912) and edges (e.g., 906, 910, 914) connecting the nodes, where the nodes represent entities or attributes of the entities, where the edges represent relationships between the entities or relationships between the entities and the attributes.

(H1) In another aspect, some embodiments include a computing system (e.g., 102) including a processor (e.g., 104) and memory (e.g., 106). The memory stores instructions that, when executed by the processor, cause the processor to perform any of the methods described herein (e.g., any of G1-G3).

(I1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of G1-G3).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

What is claimed is:

1. A computing system, comprising:
    a processor; and
    memory storing instructions that, when executed by the processor, cause the processor to perform acts comprising:
        receiving an indication that a user has selected a passage shown on a search engine results page (SERP) presented on a display, wherein the passage references an entity;
        upon receiving the indication, identifying a plurality of suggested queries related to the passage, wherein the plurality of suggested queries are generated by way of a computer-implemented generative model that takes the passage and an entry for the entity in a knowledge graph as input, wherein the plurality of suggested queries are identified based upon output of the computer-implemented generative model; and
        upon identifying the plurality of suggested queries, presenting the plurality of suggested queries in a pop-up graphical element that overlays a portion of the SERP, wherein the pop-up graphical element is located proximate to the passage shown on the SERP.

2. The computing system of claim 1, wherein the passage is selected when a mouse cursor of a mouse hovers over the passage shown on the SERP.

3. The computing system of claim 1, wherein the indication comprises an identifier for the passage, wherein the plurality of suggested queries are identified based upon the identifier for the passage.

4. The computing system of claim 1, wherein the passage is located in a knowledge card shown on the SERP, the acts further comprising:
    receiving a second indication that the user has selected a query in the plurality of suggested queries;
    obtaining a second SERP based upon the query; and
    presenting the second SERP on the display, wherein the second SERP includes the knowledge card.

5. The computing system of claim 1, the acts further comprising:
    prior to receiving the indication that the user has selected the passage, receiving a query;
    obtaining the SERP based upon the query; and
    presenting the SERP on the display.

6. The computing system of claim 1, the acts further comprising:
    receiving a second indication that the user has selected a query in the plurality of suggested queries;
    obtaining a second SERP based upon the query; and
    presenting the second SERP on the display.

7. The computing system of claim 1, the acts further comprising:
    prior to receiving the indication, generating a plurality of candidate suggested queries based upon the passage and the entry for the entity in the knowledge graph;
    removing a subset of queries from the plurality of candidate suggested queries based upon relevance criteria, thereby generating a plurality of pruned candidate suggested queries;
    ranking the plurality of pruned candidate suggested queries based upon ranking criteria, thereby generating a ranked plurality of pruned candidate suggested queries; and
    selecting a number of top-ranked queries from the ranked plurality of pruned candidate suggested queries, thereby generating the plurality of suggested queries.

8. The computing system of claim 1, the acts further comprising:
    subsequent to presenting the plurality of suggested queries in the pop-up graphical element, receiving a second indication that the user has selected a second passage shown on the SERP;
    upon receiving the second indication, identifying a second plurality of suggested queries related to the second passage, wherein the second plurality of suggested queries are generated based upon the second passage and the entry for the entity in the knowledge graph; and
    upon identifying the second plurality of suggested queries, presenting the second plurality of suggested queries in a second pop-up graphical element that overlays a second portion of the SERP, wherein the second pop-up graphical element is located proximate to the second passage shown on the SERP.

9. The computing system of claim 8, wherein the pop-up graphical element is removed from the SERP when the passage is no longer selected.

10. The computing system of claim 1, wherein the plurality of suggested queries are included in the SERP, wherein the plurality of suggested queries are initially hidden from display in the SERP, wherein the plurality of suggested queries are presented in the pop-up graphical element when a cursor hovers over the passage in the SERP.

11. The computing system of claim 1, wherein the generative model is a transformer model.

12. A method executed by a processor of a computing system, the method comprising:
    receiving a first indication that a user has selected a passage shown on a search engine results page (SERP) presented on a display;
    upon receiving the first indication, identifying a plurality of suggested queries related to the passage, wherein the plurality of suggested queries are generated by way of a computer-implemented generative model that takes the passage and an entry for an entity in a knowledge graph as input, wherein the plurality of suggested queries are identified based upon output of the computer-implemented generative model;
    upon identifying the plurality of suggested queries, presenting the plurality of suggested queries in a pop-up graphical element that overlays a portion of the SERP, wherein the pop-up graphical element is located proximate to the passage shown on the SERP;

receiving a second indication that the user has selected a query in the plurality of suggested queries; and upon receiving the second indication, presenting a second SERP on the display, wherein the second SERP is based upon the query.

13. The method of claim 12, wherein the passage references the entity.

14. The method of claim 12, wherein the SERP is removed from the display when the second SERP is presented on the display.

15. The method of claim 12, wherein the passage is located in a knowledge card shown on the SERP, wherein a portion of information displayed in the knowledge card is from the knowledge graph.

16. The method of claim 12, wherein the entity is one of:
a person;
a place; or
an event.

17. The method of claim 12, wherein the plurality of suggested queries are ranked based upon ranking criteria, wherein the ranking criteria comprises queries submitted by a plurality of users and selections of uniform resource locators (URLs) on SERPs by the plurality of users, wherein the SERPs are based upon the queries.

18. A non-transitory computer-readable storage medium comprising instructions that, when executed by a processor of a computing system, cause the processor to perform acts comprising:

receiving an indication from a computing device of a user that the user has selected a passage shown on a search engine results page (SERP) presented on a display of the computing device, wherein the computing device is in network communication with the computing system;

upon receiving the indication, identifying a plurality of suggested queries related to the passage, wherein the plurality of suggested queries are generated by way of a computer-implemented generative model that takes the passage and an entry for an entity in a knowledge graph as input, wherein the plurality of suggested queries are identified based upon output of the computer-implemented generative model; and upon identifying the plurality of suggested queries, transmitting the plurality of suggested queries to the computing device, wherein the plurality of suggested queries are presented in a pop-up graphical element that overlays a portion of the SERP, wherein the pop-up graphical element is located proximate to the passage shown on the SERP.

19. The non-transitory computer-readable storage medium of claim 18, the acts further comprising:

receiving a second indication from the computing device that the user has selected a query in the plurality of suggested queries, wherein the second indication comprises the query;

obtaining a second SERP based upon the query; and transmitting the second SERP to the computing device, wherein the second SERP is presented on the display.

20. The non-transitory computer-readable storage medium of claim 18, wherein the knowledge graph comprises nodes and edges connecting the nodes, wherein the nodes represent entities or attributes of the entities, wherein the edges represent relationships between the entities or relationships between the entities and the attributes.

* * * * *